(12) United States Patent
Lund

(10) Patent No.: US 6,728,342 B2
(45) Date of Patent: Apr. 27, 2004

(54) TTY MESSAGING

(75) Inventor: Arnold M. Lund, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 48 days.

(21) Appl. No.: 10/143,624

(22) Filed: May 9, 2002

(65) Prior Publication Data

US 2003/0210767 A1 Nov. 13, 2003

(51) Int. Cl.[7] .............................................. H04M 11/00

(52) U.S. Cl. ........................................ 379/52; 379/93.17

(58) Field of Search ............................ 379/52, 93.15, 379/93.17, 93.18, 93.22, 93.26, 93.27, 93.01; 340/825.52

(56) References Cited

U.S. PATENT DOCUMENTS

| | | | |
|---|---|---|---|
| 5,940,475 A | 8/1999 | Hansen | |
| 5,943,395 A | 8/1999 | Hansen | |
| 5,978,654 A | * 11/1999 | Colwell et al. | ........ 340/825.52 |
| 6,002,749 A | 12/1999 | Hansen et al. | |
| 6,078,650 A | 6/2000 | Hansen | |
| 2002/0057765 A1 | * 5/2002 | Hyziak et al. | ................ 379/52 |

* cited by examiner

Primary Examiner—Stella Woo
(74) Attorney, Agent, or Firm—Townsend and Townsend and Crew LLP

(57) ABSTRACT

A method for communicating text through a telephone system comprises the steps of generating a text message in a TTY format and electronically converting the text message in the TTY format to a pager format capable of display on a pager. The text message is sent to the pager in pager format and displayed on the pager. The user of the pager may then communicate back with the user of the TTY device through another communications device, such as a pay phone.

44 Claims, 2 Drawing Sheets

TTY MESSAGING

BACKGROUND OF THE INVENTION

The passage of the Telecommunications Act of 1996 has moved the telecommunications industry to consider the development of telecommunication technologies that provide equal access to handicapped phone users. Currently, the deaf and hard of hearing use specific devices, known as TTY devices (teletype) or telecommunication devices for the deaf (TDD) to communicate across a POTS network (Plain Old Telephone System). These devices consist of a keyboard, display screen, and modem. The modem links to a regular telephone. When the handicapped phone user places a phone call, he types his message into the keyboard, and the device then converts the characters of the message into electrical signals that travel over normal phone lines. When these electrical signals reach another TTY device, they are converted back into letters which appear on a display screen. The message may also be printed on paper.

Typically, a person communicating on a TTY device can only communicate with another individual with another TTY device. As a consequence, the handicapped individual is greatly limited in the number of individuals he or she may contact. Because of limits with existing TTY devices, many of the new advances available to the public are not available to the handicapped.

Phone services have developed wherein operators who have TTY devices receive calls on behalf of the handicapped. For example, a handicapped individual may place a call to the operator, who will then relay a message to a third party that may not have a TTY device. This form of communication, however, reduces the level of privacy available to the handicapped individual and his desired contact.

A need therefore exists for an improved method of communication between the handicapped individual and individual without access to TTY equipment.

SUMMARY OF THE INVENTION

The invention comprises a method for linking a user with a TTY device to a third party without such a device through phone network systems. The user of the TTY equipment may send a text message in a format for the TTY equipment, a known TTY format, such as Baudot format. The message is translated electronically using software into a format suitable for the non-TTY device, such as a pager. The text message is then sent to the paging network which routes the translated message to a customer with a pager.

In addition, rather than only sending a single message, a TTY user may also have the option of waiting for the individual with the pager to find a telephone. If the TTY user waits, the pager user may be notified that the customer is waiting for a return phone call. The pager user may then use an ordinary phone and dial a special number, provide a personal identification number (PIN), and then have his phone line associated with his pager number. Following this association, the user of the TTY device may be notified to begin text messaging. The pager user may receive the TTY user's text message over his pager's display. The pager user may then use his keypad on his phone or his pager, if the pager is a two-way pager, to type a return text message back to the user of the TTY device. As the pager user enters text using his keypad, he may see his text message on his pager and any return message from the user of the TTY device on his pager display. Other input devices, such as speech recognition devices, may be used to create text messages in this way.

Moreover, the TTY device need not be a traditional piece of equipment. For example, the device could be a computer work station or server accessed remotely. Accordingly, the pager and signal input device, such as the touch-tone pad, may be used to command the work station or server remotely. This invention thus uses existing telecommunication devices to facilitate text messaging between TTY users and individuals without immediate access to TTY equipment.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
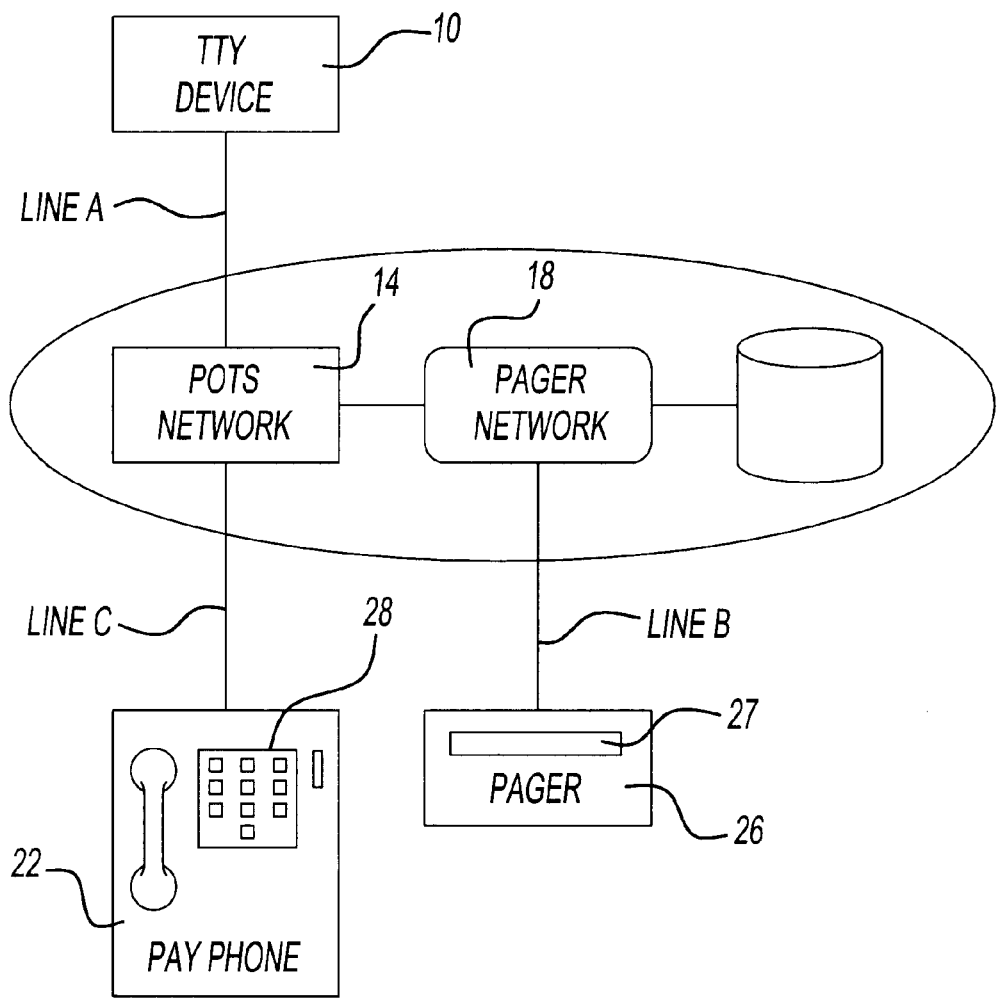
FIG. 1 is a schematic representation of the invention, including subscriber lines, TTY device, pager and pay phone and pager networks.

FIG. 1 illustrates a network layout for the inventive technique. As known, TTY device 10, such as a telecommunications device for the deaf, is linked through subscriber line A to POTS network 14, a Plain Old Telephone Service. TTY device 10 may be standard display and keyboard with modem interface to POTS network 14. In contrast to the prior art, rather than employ an operator to place a call to a non-TTY device, such as a pager, the inventive technique directly links POTS network 14 to pager network 18. A software application within POTS network 14 or, alternatively, pager network 18, may be called up to translate the signal from the TTY device in a standard TTY format, such as a Baudot format, to a pager format, such as ASCII. Following translation of the message from the TTY device 10, the message may pass to pager 26 through subscriber line B. Pager 26 then displays the translated message on its display screen 27.

Figure 2:
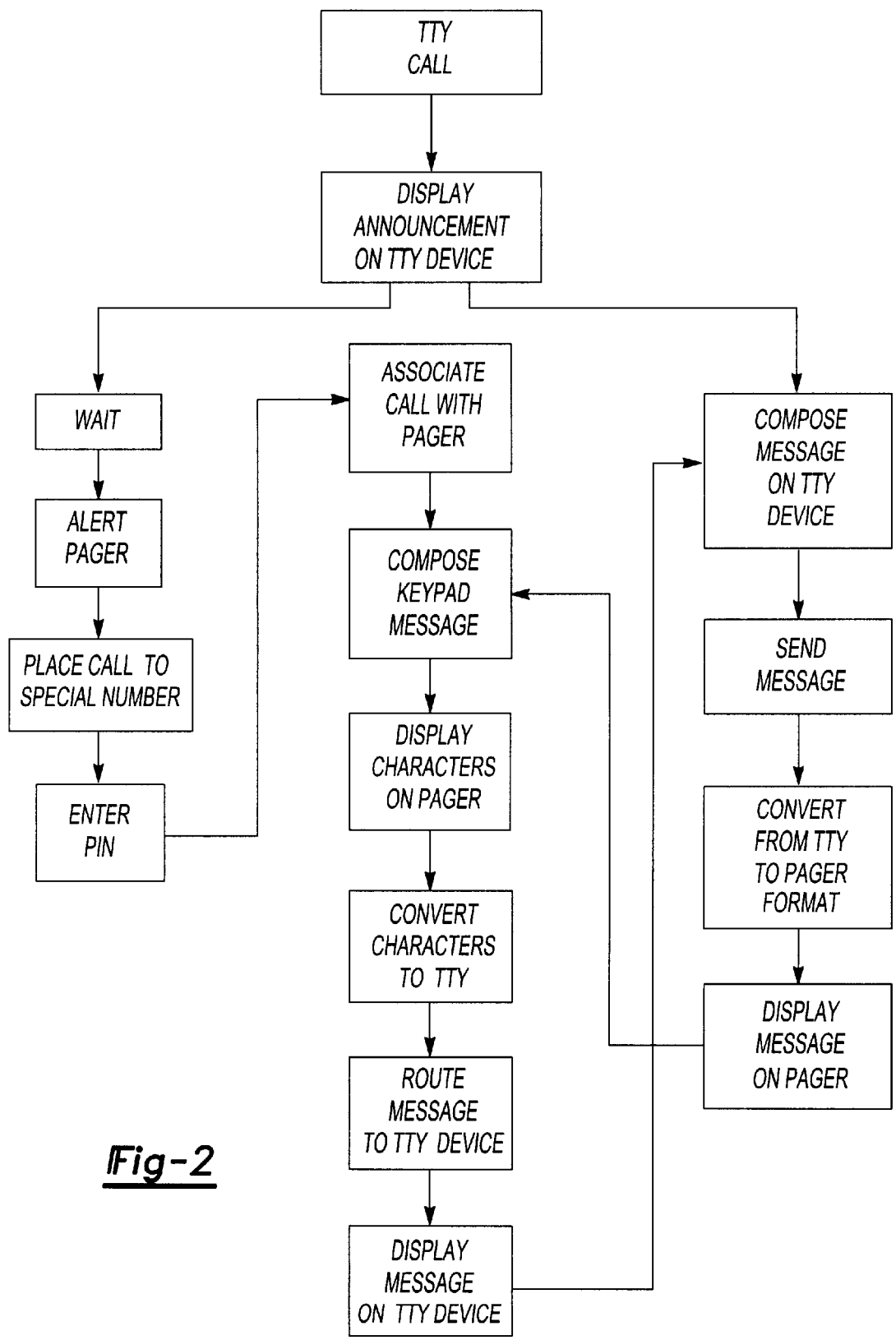
FIG. 2 is a flowchart describing the manner in which communications may occur over the networks described in FIG. 1.

Once an individual receives the message on pager 26, he may then access another subscriber line, here line C of pay phone 22. As shown in FIG. 2, pay phone 22 may be employed to communicate with the user of the TTY device 10 without aid of another TTY device or operator as follows. TTY call is placed using TTY device 10. In the event the intended recipient of the phone call is away from a TTY device but has a pager 26, a message or announcement is displayed on the TTY device 10 inquiring whether the user of the TTY device 10 wishes to wait or, alternatively, compose a message on the TTY device 10 to be sent immediately. If the latter, then the message is sent to display 27 of pager 26. On the other hand, if the user of the TTY device 10 waits, the pager 26 is alerted and the intended recipient who has the pager 26 is given a message that the user of the TTY device 10 is awaiting a return phone call.

The pager user may then place a separate phone call to a special phone number on a device such as pay phone 22, on subscriber line C. Once the call is placed, the pager user enters a PIN number which permits the phone call on pay phone 22 to be associated with pager 26. Once this association is made, pay phone 22 on line A is connected to TTY device 10 on line C and pager 26 on line B. Pager user may then compose a character by character message on the touch-tone keypad 28 of pay phone 22 which may be sent character by character or, alternatively, as part of an entire message to user of a TTY device 10. Rather than a touch-tone keypad 28, speech recognition software or other commercially available input device may be used in POTS Network 14. The characters are composed on the keypad 28 of pay phone 22 and routed as subscriber line C to subscriber line B through POTS network 14 and pager network 18 and subsequently displayed on pager 26, for example character by character, permitting pager user to see the message he intends to send to the user of the TTY device 10 prior to sending on subscriber line A. Once the pager user is satisfied with his message or its characters, the characters are passed to POTS network 14 through line C and a software application then translates these characters into TTY format for TTY device. The translated message is then routed over line A to TTY device 10 for display.

Once the message is displayed on the TTY device 10, the TTY device user may compose a responsive message on the TTY device 10, send the message through line A to POTS network 14 which converts the message from TTY format to pager format. This pager formatted message is then relayed through line B and pager network 18 to pager 26 for display. This communication may go back and forth between TTY user and pager user through these subscriber lines, line A, line B and line C. In this way, an individual without access to a TTY device may communicate with an individual with a TTY device. This technique further uses existing network infrastructure, electronics and equipment to provide greater freedom to TTY users in the range of individuals they may contact and also ensures the privacy of the communication.

In addition, this technique can be broadened by replacing the standard TTY device 10 with a computer work station. In this arrangement, the individual with the pager may use the touch-tone pad of his pager or a telephone to command the computer work station as a virtual terminal. Moreover, the TTY device could be a computer server with an application that permits remote access. Thus, the user of the pager would be permitted to have not only an audio interface with the computer, but also obtain text feedback from the computer.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A method of communicating text via a telephone system, comprising the steps of:
   a) receiving a signal from a first subscriber on a first subscriber line;
   b) generating text characters in response to the signal;
   c) sending the text characters over a second subscriber for review by the first subscriber; and
   d) sending the text characters to a second subscriber on a third subscriber line.
2. The method of claim 1 including the step of:
   e) alerting the first subscriber via the second subscriber line before said steps a)–d).
3. The method of claim 2 including the step of:
   f) receiving a telephone connection on the first subscriber line in response to step e) and prior to step a).
4. The method of claim 3 including the step of:
   g) receiving a code on the first subscriber line after step f).
5. The method of claim 4 including the step of:
   h) associating the first subscriber with the second subscriber line based upon step h); and
   i) connecting with the second subscriber line based upon step h) prior to steps a)–d).
6. The method of claim 1 including the step of:
   j) sequentially transmitting each character in said step c) subsequent to its generation in said step b) and prior to the generation of each subsequent character in step c).
7. The method of claim 1 wherein step c) allows the characters to be displayed on a pager connected to the second subscriber line.
8. The method of claim 1 including the step of:
   i) composing a textual message via steps a)–c) for display via the second subscriber line.
9. The method of claim 8 including the step of:
   sending the first textual message to a third subscriber line for display to the second subscriber.
10. The method of claim 9 including the step of:
    sending a second textual message from the third subscriber line to the second subscriber line for display on a pager connected to the second subscriber line.
11. The method of claim 10 including the step of:
    alternately sending on the second subscriber line for display text messages from the first subscriber line and the third subscriber line.
12. The method of claim 1 wherein the signal is created by generating touch-tones on the first subscriber line.
13. The method of claim 1 including the step of:
    o) converting the characters into a TTY format.
14. A method of providing text communication via a telephone system, the method comprising:
    receiving a text message in a TTY format via a connection with a first subscriber line;
    converting the text message to a non-TTY format;
    transmitting the text message via a connection with a second subscriber line to a communication device configured to receive text messages;
    receiving a responsive message in a non-TTY format via a connection with a third subscriber line;
    converting the responsive message to a TTY format; and
    transmitting the responsive text message via the connection with the first subscriber line.
15. A method as recited in claim 14, wherein the communication device configured to receive text messages is a pager.
16. A method as recited in claim 15, wherein converting the message to a non-TTY format comprises converting the text message to a pager format.
17. A method as recited in claim 14, further comprising receiving a PIN via a connection with the third subscriber line.
18. A method as recited in claim 17, further comprising, upon receiving the PIN, associating the second subscriber line with the third subscriber line.
19. A method as recited in claim 18, further comprising transmitting the responsive message via the connection with the second subscriber line.

20. A method as recited in claim 19, further comprising, after transmitting the responsive message via the connection with the second subscriber line and before transmitting the responsive message via the connection the first subscriber line, receiving confirmation via the connection with the third subscriber line that the responsive message should be transmitted via the connection with the first subscriber line.

21. A method as recited in claim 19, wherein transmitting the responsive message via the connection with the second subscriber line comprises transmitting the responsive message character-by-character.

22. A method as recited in claim 14, wherein receiving a responsive message comprises receiving DTMF tones via the connection with the third subscriber line.

23. A method as recited in claim 22, further comprising converting the DTMF tones to text.

24. A method as recited in claim 14, wherein receiving a responsive message comprises receiving a spoken message via the connection with the third subscriber line.

25. A method as recited in claim 24, further comprising converting the spoken message to text.

26. A telecommunication system for providing text communication, the system comprising:
a telephone network comprising connections to a plurality of subscriber lines and being configured to:
receive a text message in a TTY format via a connection with a first subscriber line;
convert the text message to a non-TTY format;
transmit the message via a connection with a second subscriber line, the second subscriber line being associated with the pager network;
receive a responsive message in a non-TTY format via a connection with a third subscriber line;
convert the responsive message to a TTY format; and
transmit the responsive message via the connection with the first subscriber line.

27. A communication system as recited in claim 26, further comprising a pager network in communication with the telephone network, wherein the second subscriber line is associated with the pager network, and wherein the telephone network is further configured to transmit the message to a pager via the second subscriber line.

28. A communication system as recited in claim 27, wherein converting the text message to a non-TTY format comprises converting the text message to a pager format.

29. A communication system as recited in claim 27, wherein the telephone network is further configured to receive a PIN via a connection with the third subscriber line.

30. A communication system as recited in claim 29, wherein the telephone network is further configured, after receiving the PIN, to associate the second subscriber line with the third subscriber line.

31. A communication system as recited in claim 30, wherein the telephone system is further configured to transmit the responsive message via the connection with the second subscriber line.

32. A communication system as recited in claim 31, wherein the telephone system is further configured to, after transmitting the responsive message via the connection with the second subscriber line and before transmitting the responsive message via the connection the first subscriber line, receive confirmation via the connection with the third subscriber line that the responsive message should be transmitted via the connection with the first subscriber line.

33. A communication system as recited in claim 32, wherein the telephone network is further configured to transmit the responsive message character-by-character via the connection with the second subscriber line.

34. A communication system as recited in claim 26, wherein the responsive message comprises DTMF tones.

35. A communication system as recited in claim 34, wherein the telephone network is further configured to convert the DTMF tones to text.

36. A communication system as recited in claim 26, wherein the responsive message comprises a spoken message.

37. A communication system as recited in claim 36, wherein the telephone network is further configured to convert the spoken message to text.

38. A communication system as recited in claim 26, wherein the telephone network is a POTS network.

39. A communication system for providing text communications, the system comprising:
means for receiving a text message in a TTY format via a connection with a first subscriber line;
means for converting the text message to a non-TTY format;
means for transmitting the text message via a connection with a second subscriber line to a communication device configured to receive text messages;
means for receiving a responsive message in a non-TTY format via a connection with a third subscriber line;
means for converting the responsive message to a TTY format; and
means for transmitting the responsive text message via the connection with the first subscriber line.

40. A system as recited in claim 39, further comprising means for receiving confirmation via the connection with the third subscriber line that the responsive message should be transmitted via the connection with the first subscriber line.

41. A system as recited in claim 39, wherein receiving a responsive message comprises receiving DTMF tones via the connection with the third subscriber line, the system further comprising means for converting the DTMF tones to text.

42. A system as recited in claim 39, wherein receiving a responsive message comprises receiving a spoken message via the connection with the third subscriber line, the system further comprising means for converting the spoken message to text.

43. A system as recited in claim 39, further comprising means for receiving a PIN via a connection with the third subscriber line.

44. A system as recited in claim 43, further comprising:
means for associating the second subscriber line with the third subscriber line.

* * * * *